United States Patent [19]

Johnson et al.

[11] Patent Number: 5,790,637
[45] Date of Patent: Aug. 4, 1998

[54] EXTENDED VOICE MESSAGING

[75] Inventors: Jack J. Johnson; William F. Coyle, both of Summit, N.J.

[73] Assignee: Geophonic Networks, Inc., Summit, N.J.

[21] Appl. No.: 602,979

[22] Filed: Feb. 16, 1996

Related U.S. Application Data

[60] Provisional application No. 60/004,857 Oct. 5, 1995.
[51] Int. Cl.[6] ........................................................ H04M 1/65
[52] U.S. Cl. ........................ 379/67; 379/100.01; 379/112
[58] Field of Search ................................. 379/67, 88, 89, 379/202, 100.01, 112

[56] References Cited

U.S. PATENT DOCUMENTS

| | | | |
|---|---|---|---|
| 5,260,986 | 11/1993 | Pershan | 379/89 |
| 5,333,266 | 7/1994 | Boaz et al. | 379/94 |
| 5,497,373 | 3/1996 | Hulen et al. | 370/359 |
| 5,528,670 | 6/1996 | Elliot et al. | 379/89 |

*Primary Examiner*—Daniel S. Hunter
*Attorney, Agent, or Firm*—Allen N. Friedman

[57] ABSTRACT

The disclosed voice-based communications system and method provides an architecture for communication among team-organized users. After a single, voice accessed log on procedure, a user who is a member of more than one team is able to designate a team and enter a communication session, within which the user can communicate with members of that team, either individually or as a group (by broadcast). After completing communication with correspondents associated with the first-team's activities, the user can transfer to a second communication session, within which communication with members of a second-team takes place. The computer and software that controls the system assures that within each team communication session, communication is permitted only among members of one team. Team membership and the communication services available to each team are controlled by each team's team organizer. Within each team communication session the user is provided with a team mailbox for receiving voice (or, optionally, facsimile or e-mail) messages from members of the team associated with that session. The user is provided with facilities to send voice (facsimile, e-mail) messages to those team members (each having an individual team mailbox). Each user's activity while in a team communication session is tracked so that all communication service charges can be attributed and, typically, billed to the team, enabling users on multiple teams to segregate such charges by team.

27 Claims, 6 Drawing Sheets

EXTENDED VOICE MESSAGING

RELATED APPLICATION

This is a continuation-in-part of our previously filed U.S. provisional application, Ser. #60/004857, filed Oct. 5, 1995. The disclosure of the Provisional Application is incorporated herein by reference.

BACKGROUND OF THE INVENTION

1. Field of the Invention

The invention relates to facilitating exchange of voice messages and ancillary information, within groups of affiliated individuals.

2. Description of the Background Art

Various forms of stored voice communication have become an important feature of personal and commercial interaction, from simple answering machines to the most complex voice mail system. Systems are known that integrate voice mail capabilities with voice recognition, database handling and voice conversion (U.S. Pat. No. 5,479,491, Issued Dec. 26, 1995). Octel Communications Corporation, active in this field, provides services that integrate voice messaging and related messaging services, with an interactive voice response capability to improve the human-machine interface (U.S. Pat. No. 5,179,585, issued Jan. 12, 1993 and U.S. Pat. No. 5,416,830 issued May 16, 1995). By supplying the ability to link systems with incompatible interfaces, Octel's service promises to provide global voice, facsimile and e-mail communication.

Despite great strides in voice based communication systems, existing systems are limited in their ability to perform such functions as group oriented two-way voice messaging, group oriented document sharing, group oriented speed dialing, group oriented information security and group oriented cost allocation. The herein disclosed inventive communication architecture provides a capability for groups to communicate with convenience, efficiency, privacy and security, while having access to voice, facsimile and e-mail technology, and the ability to segregate communication costs by work group.

SUMMARY OF THE INVENTION

The disclosed voice-based communications system and method provides an architecture for communication among team-organized users. For example, a corporate acquisition may involve a team of business executives, attorneys, bankers, accountants and consultants from the corporate acquiror and/or acquiree as well as from outside firms or organizations. After a single, voice accessed logon procedure, a user who is a member of more than one team (for example, a banker may be involved in several such projects at one time) is able to designate a team and enter a communication session, within which the user can communicate with members of that team, either individually or as a group (by broadcast). After completing communication with correspondents associated with the first team's activities, the user transfers to a second communication session, within which communication with members of a second team takes place. The computer and software that controls the system assures that within each team communication session, communication is permitted only among members of one team.

Team membership and the communication services available to each team are controlled by each team's team organizer. Within each team communication session the user is provided with a team mailbox for receiving voice (or, optionally, facsimile or e-mail) messages from members of the team associated with that session. The user is provided with facilities to send voice (facsimile, e-mail) messages to those team members (each having an individual team mailbox). Each user on the system is assigned one unique mailbox number as an umbrella messaging address, regardless of whether that user is a member of one team or many teams. The user may also have a speed dial capability to place a voice call to a team member and ad hoc conferencing capability to place a series of voice calls to more than one team member while bridging such calls together to create a team oriented conference call.

Each user's activity while in a team communication session is tracked so that all communication service charges can be attributed and, typically, billed to the team, enabling users on multiple teams to segregate such charges by team. For communications not related to any team on the system, the user may arrange for a personal communication session from which he can originate a communication to anyone on the system, but receive a communication only from individuals he designates. Personal session service charges are segregated from team-related charges and, typically, billed to the user. Once logged into the system, the user moves from session to session and service to service, without any further logon requirement (although an additional security access code may be required to use certain services within a session). The system's database is continually updated by the system administrator or team organizers to contain the current team membership lists and the location and access information for each team member. The system can also accommodate teams whose members' identities are known to the team organizer but unknown to the system administrator.

DETAILED DESCRIPTION OF THE INVENTION

General

Figure 1:
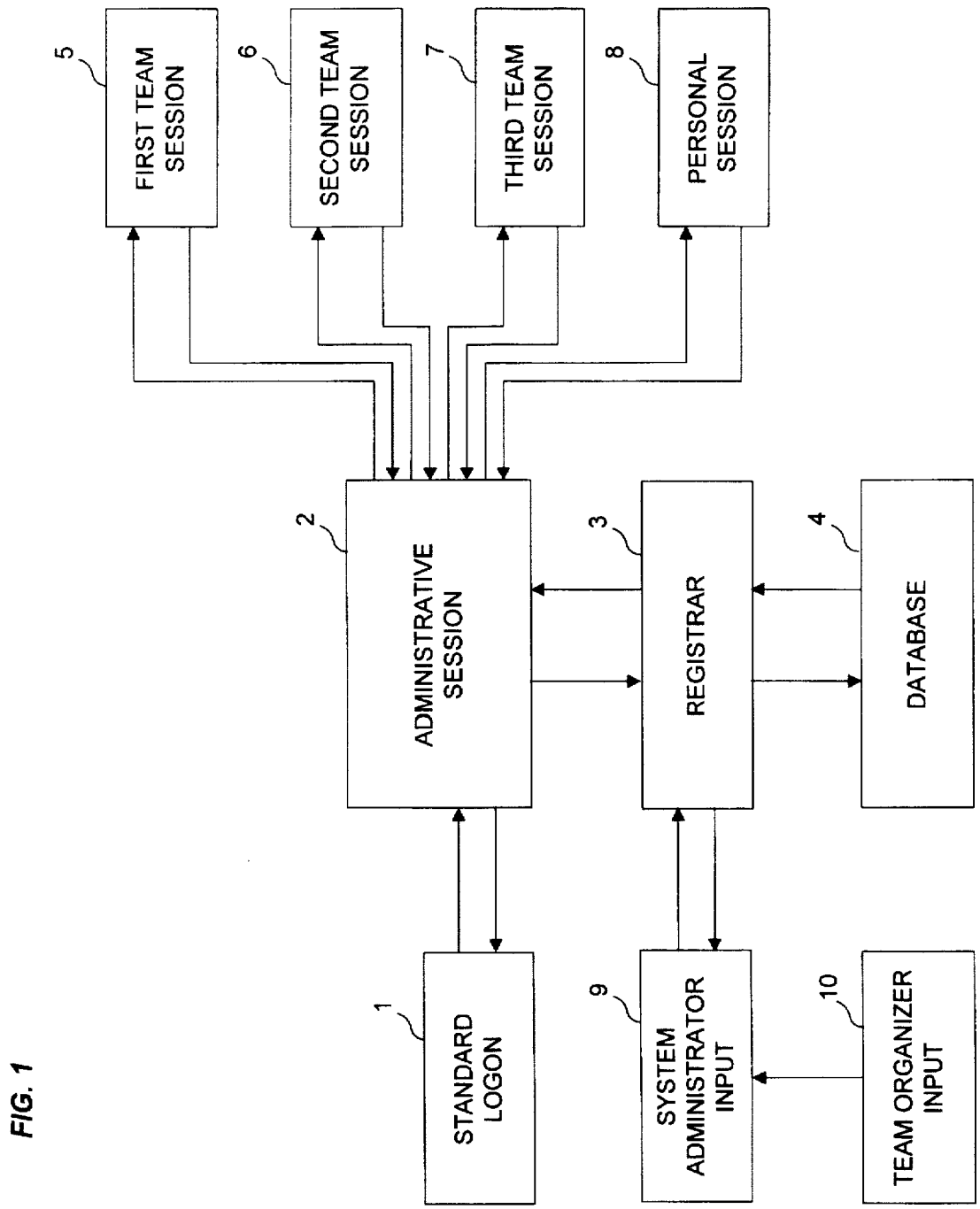
FIG. 1 is a block diagram showing information transfer between logical elements of the disclosed communication architecture, illustrating team organizer input through the system administrator.

The system is intended to facilitate communications among professionals, business executives, government officials and others engaged in projects, transaction or cases in which such participants are (i) employees of different firms, companies or agencies, or (ii) employees of the same firm, company or agency but who, for security and other reasons, desire to use the package of features offered by the system (including advanced voice messaging, direct voice connection using speed dialing, voice recognition, broadcast facsimile and fax-on-demand, conference calling, document sharing, enhanced security and segmented billing). The system is of particular advantage to professionals, business executives and government officials who may participate in several projects, transactions or cases at the same time. Many users may also find it advantageous to use the system to carry on inter-firm two-way voice messaging and document sharing—not necessarily related to a specific project, transaction or case—with counterparts, clients and other subscribers with whom they have continuing business relationships.

Messaging and document sharing between parties is tightly constrained to block unauthorized senders. Messaging and document sharing within project or transaction working groups or teams is restricted so that no user outside the team can send or receive messages or documents to or from any member of the team. Each message or document sent or forwarded by one user to another is tracked to enable enhanced security, detailed reporting and segmented billing according to the projects, transactions or cases being worked on or otherwise as the user, the team organizer or the system administrator determines.

Users are also able to direct the system to speed dial pre-authorized phone numbers in order (i) to reach another user, (ii) to make a conference call reservation or to organize an immediate conference call with other team members (while the user is in a team session), (iii) to contact the administrator's customer service function or (iv) in selected cases (e.g., from his personal communication session), to call his office phone number and/or his own firm's voice mail system. When such a phone call ends, the user is able to resume his communication session on the system without hanging up, redialing, and logging back in.

Each user with a personal communication session is able to control which other users are permitted (i) to send or forward messages or documents to the mailbox within his personal session and (ii) to speed dial his telephone number when in their own personal session. Otherwise, features and functions within personal sessions are similar to those offered in team sessions.

Voice recognition technology may be provided to allow subscribers to identify the intended recipient of a message or document or to speed-dial a call by speaking the recipient's name. This technology is implemented in a combination of hardware and software.

Substantial voice storage can be made available to all users, as another feature of the system. As part of this enhanced storage capability, users are offered an option to store any messages (or replies) they send to other subscribers, similar to the archiving function offered as a standard feature on most e-mail systems.

System Architecture

In this system each user is assigned a single set of logon codes (e.g., account I.D. and password). Once successfully logged on, the user will be in his administrative session able to listen to and respond to administrative messages from the service provider. He will also be able to perform a limited set of administrative functions, including pre-setting (and re-setting) the order in which he will be given access to each of his team communication sessions.

When a user successfully logs on, the administrative session will query the computer's registrar function (Registrar) to determine which team communication sessions this user can access. The Registrar checks its database files for that user and answers the query by making available to the user only those sessions relating to specific team(s) for which access by that user has been and continues to be authorized. The Registrar will also make available to the user a personal communication session for communications not related to any team on the system.

If a user has not pre-set the order in which communication sessions should be presented, he will be asked by an interactive voice response ("IVR") menu to select a first session to access. When he is finished doing business in that first session, he will be asked to choose a second session to enter and so on. It is expected that most users will find it most convenient to pre-set this order of presentation and move from one session to the next by signaling the system each time a session is ended.

The system administrator updates the Registrar's database files regularly to reflect changes in the status of teams and users. If, for example, a team disbands or a user is otherwise no longer a participant on a specific team, the system administrator (upon the advice of the team organizer) would amend the Registrar's database accordingly and the Registrar would thereafter deny that user continuing access to his team session relating to that specific team, unless instructed otherwise. The system administrator may also direct the Registrar to limit to selected teams or users the availability of certain features (e.g., speed-dialing in general or speed dialing to specific numbers, such as conference call reservationists). As the volume of change requests increases, it may be advantageous, with appropriate security safeguards, to permit the team organizer to input changes directly into the system.

In general, while inside a team session the user can (i) send, forward and broadcast messages or documents to, (ii) receive messages or documents from, and (iii) speed-dial to only those other users who are members of the same team. In addition, each team has its own membership directory, searchable by the user only when inside his respective team communication session. Personal communication sessions function similarly, but with more freedom given to the user to expand and contract his set of communicating relationships.

Each user on the system is assigned one unique mailbox number as an umbrella messaging address. Whether the user is on one team or many teams, all senders of messages or documents to this user may address the message or document by entering the user's unique mailbox number. The system recognizes the specific team communication session from which the sender sent the message or document and delivers it (assuming sender and recipient are members of the same team) to the mailbox within the user's corresponding team communication session. This unique mailbox number may also be used to address messages and documents sent to the mailbox within the user's personal communication session.

This architecture enables the system to track, segment and attribute (i) all on-line user activity relating to each project team on which a user may be participating, as well as (ii) the activity carried on by a user (in his personal communication session) that does not relate to a specific project team.

To assure convenience and confidentiality for the user, and accuracy in administering the system, the system provides users with a unique session consolidation function. When a new team is established on the system, all members of that new team are assigned a team communication session with an unique account I.D. and temporary password. During each user's initial call to the system, after logging in using these new codes, an IVR menu gives the user who is already an active participant on the system (as a member of another team and/or as a user of a personal communication session) the opportunity to consolidate access to this new team session using the user's pre-existing account I.D. and password logon codes.

If a user elects to consolidate, he will direct the Registrar through an IVR menu to link this new team session to his pre-existing electronic address on the system. The next time he logs on using his pre-existing account I.D. and password, he will be able to access his pre-existing communication sessions (team and/or personal) as well as his new team session, newly consolidated at this pre-existing address. As with all communication sessions on the system, all activities within this new team session are carried on separately from those in any of this user's other communication sessions, through all are accessed by the user after passing through a single logon procedure. The Registrar will play the same role as previously described for any sessions so consolidated.

Hardware Configuration

The hardware platform for the system can, initially, use one voice response unit ("VRU"), based on a switch, a control computer and a database. This VRU is equipped to handle many simultaneous incoming calls from users and includes input and output peripheral devices such as voice-digital conversation devices and telecommunication interface devices.

Once a user logs into his administrative session he may choose which of his several teams he wishes to access and then elect (i) to play any messages or retrieve any documents from, or send any messages or documents to, any of his respective team members or personal session correspondents, (ii) to call any of those persons or (iii) to engage in any of the other options offered by the system. Calls made by the user while in one of his communication sessions are handled through the switching components of the VRU. The VRU will dial the telephone number on file in its database for the person the user wishes to reach. The switch will handle this call at the direction of the control computer. When this call is finished, the switch will drop the outbound line and redirect the user back to the control computer so that the user can continue his communication session.

As the number of users grows, this hardware platform can be expanded by adding VRUs. Each user will be assigned to a specific VRU as his "home" VRU and be instructed to log in by calling an 800 telephone dedicated to this VRU. All VRUs will be networked together to enable users with different home VRUs to send messages or documents to each other, if they are part of the same team or wish to correspond using the capabilities within their personal communication sessions. To facilitate such networking and expedite system response time, a database server (or servers) can be added to handle certain database functions, such as storage of team rosters. This server interacts with all VRUs in the network. Again, a user can elect to directly call any of his team members or personal session correspondents as described previously. When such a call is finished, the user will return to the VRU and be able to continue the communication session from which he originated the call (or select another communication session, team or personal, to enter).

When the platform grows to a size determined by the engineering characteristics of the VRU components, a front end switch can be added to the network of VRUs and database server(s) in order to reduce the number of incoming and outgoing telephone lines needed to handle calls to the system. Users will then all be able to call the same 800 telephone number to reach the system and this front-end switch will redirect such calls to their respective home VRUs in order for the users to log on to the system. The switch component within each VRU will continue to perform the function previously described, but will direct any outbound calls by users through the front-end switch to reach the public network or any other external network to which the system is connected. When such a call is finished, the front-end switch will drop this outbound line and return the user to this home VRU to continue his communication session.

Exemplary Messaging Network

A. Architecture

The system can be initially implemented, for example, on one 24-port voice response unit. The system can be designed to allow ports and gigabytes of memory to be added as needed. When expanding, one VRU unit at a time can be added (each starting with 24 inbound ports) and VRUs can be networked to one or more common database servers.

To enable speed dialing and then reconnecting to the system when the call is finished, outbound ports (able to service callers on any of the inbound ports) will be added whenever new inbound ports are added to any VRU. Also, until a common front end switch is added, one T-1 line can be added for each new set of outbound ports, as well as one T-1 line for each new set of 24 inbound ports. (T-1 is a standard 1.5 Megabit digital telecommunication service obtained from a local exchange carrier or an interexchange carrier.)

A user could, if permitted, interact with any other user on the system, whether the home VRU of one user is the same or different than that of the corresponding user. Messages are advantageously stored in the VRU units, rather than the central server, to enable optimal message retrieval response time. This configuration will require each user to call the specific 800 number assigned to the VRU unit on which that user is required to log. When the system can no longer achieve its inbound connect time objective, a front-end switch can be added to optimize utilization of T-1 lines and incoming ports and move to one 800 number for all callers. More switching capacity can be added to keep pace with higher traffic levels.

When the second VRU is added to the system, a server capable of handling database functions (other than storing and playing voice messages) for several VRUs simultaneously can be added. When the performance characteristics of this first server begin to deteriorate, another server can be added. More can be added as the system grows. These servers are networked together to enable all of the VRUs to work in concert.

Voice recognition capability (e.g., using voice recognition equipment with "speaker dependent" software) can be provided (i) to identify another user's unique mailbox number in order to send a message or document to that user, (ii) to identify another user's telephone number in order to enable the caller to directly connect via speed dial to that other user, or (iii) to enable a user to create a new broadcast or group messaging list within his team. Users will also be able to identify other users, for all of the above purposes, by using mailbox numbers or searching a name-based directory of team members.

Initially, the system administrator will handle all user additions, deletions and changes, including adding and dropping teams (and team members). As the system gets busier, the team organizers can be given access to the system to perform some of these tasks. For example, a team organizer could be permitted to form a new team of pre-existing users by interacting with an IVR menu, using these subscribers' mailbox numbers to create a list of members for the new team.

B. Single Access to Multiple Sessions

In prior existing voice mail systems, each subscriber has one messaging session in which he conducts all of his messaging activity. There is only one messaging session for all activity, not separate sessions for different portions of such activity. To segregate such messaging activity by subject matter or between multiple groupings of correspondents (for purposes of security, accounting, convenience or feature enhancement), a subscriber would, typically, be required to use separate messaging sessions with separate log-on calls, separate security procedures and separate mailbox numbers. The disclosed system architecture enables a user to use only one log-on call, one security procedure and one mailbox number to achieve the functional equivalent of separate messaging sessions. This capability can be referred to as "single access to multiple sessions" or the creation of an "umbrella system address."

To log on, the user dials a telephone number to reach the system. He is answered by the system interactive voice response ("IVR") menu and prompted to enter his user I.D. and password. When this information is successfully entered, the subscriber is "logged on," and he is able to conduct separate communication sessions relating to different teams or groups of which he is a member.

Each team communication session is limited to a set of pre-established communicating relationships (entered into the system, at least initially, by the system administrator upon instructions from the team organizer). At any time the team organizer can instruct the system administrator to expand or contract the team's current set of communicating relationships. These relationships are created and maintained by the system within a computer database file structure. Each file structure so created encompasses a different team or group, and defines a distinct set of communicating relationships. The file structure (and associated set of relationships) confines the members of that team to communicating only with other members of the same team.

When a user logs on to the system he is given access to all of the different file structures (and the teams they encompass) within which he has been defined as an authorized member by the respective team organizer. The user's authorized access to a file structure (by means of a telephone keypad or voice instruction to the system) enables him to initiate a team communication session. In that session the user can utilize all the communication features of the system he has been authorized by the team organizer to use, in order to communicate with his pre-defined team members (and only his pre-defined team members) in a manner that is completely isolated from his other team and personal communication sessions (and the communication activity which is conducted within those sessions). The user can move from one communication session to another through additional telephone keypad or voice instructions to the system. The system separately records activity within each of a user's communication sessions and can therefore create individual system usage reports and billing for each team and each team member.

C. Team Communication Sessions—General

Each new user will be assigned an "umbrella system address," capable of simultaneously handling up to a predetermined number of different team communication sessions as well as a personal communication session. Within a team communication session, a user is restricted to receiving messages and documents from, sending or forwarding messages and documents to and otherwise dealing with only other members of that team. When inside a team session, a user is able to execute any function normally found in voice messaging systems (e.g., store, forward, delete, broadcast, search by name, speed up, slow down, playback, confirm receipt, scan messages, etc.). Each user with two or more communication sessions can set (and reset) the order in which these sessions are presented, when he logs on to his umbrella system address.

Whenever a user sends (or replies to) a message, he is offered the option of storing his message in a "messages sent" archive to enable him to create a record, to follow-up later, etc. (just as in e-mail systems). The dates and times of all such archived messages will be retained to further identify the message being stored. "Urgent" messages will be played only within their respective team sessions, but any team session containing an "urgent" message (if the user has more than one team session) can be put at the front of the queue. For any user who receives a message marked "urgent", the system can send the user an alert notice by facsimile (or, at a user's option, by sending a paging message or by making a voice call to the user's office telephone number).

The user may identify an intended recipient's umbrella system address by speaking the recipient's name (using voice recognition), entering the recipient's mailbox number or searching the name-based directory of team members (e.g., by keying in the first few letters of the recipient's name). The user can also retrieve another team member's mailbox number by asking the system through an IVR menu to play the team directory of "spoken names" with each member's respective mailbox number.

In many cases a user may wish to send a message or document or directly connect (via outbound speed dial) to another user, but cannot do so because the communicating relationship between them is based in a team or personal communication session other than the user's current team session. In this event the system can notify the user of the problem, advise him as to the correct communication session for this communicating relationship and then ask him if he would like to be transferred into that communication session so that he can send his message or document or directly connect to the intended recipient.

D. Team Communication Sessions—Communicating Relationships

The system will tightly restrict the creation of communicating relationships between users. A relationship will only be permitted when users are members of the same team. Only the team organizer can add or delete members of a team and then, initially, only through the system administrator. If users are members of the same team, they can send, forward and receive messages or documents to and from any of the other team members when they are inside their respective team communication sessions for that specific team (within the user's umbrella system address).

A user will be able to ask the system to recite his list of communicating relationships for each team on which he participates, by naming each of the team members and their respective mailbox numbers. If the user wishes to proceed directly to a specific party on this list, the system will accommodate that request. When inside a team communication session, the name-based directory that the user can search will contain only those users on the same team with this user. The user will have a separate directory for each team. These separate team directories are only accessible by that user when he is within the applicable team session.

Team Communication Sessions-Initialization/Consolidation

Each team member will be instructed to call the 800 number provided by the team organizer in order to enroll on a new team, even if he is an active user of the system as part of another team (and possibly using a different 800 number). The user will log on by entering, for example, the account I.D. and temporary password provided to him by the organizer of this new team. The enrollment session will be designed to validate the caller as a legitimate new member of this team and determine whether he is currently an active user of the system. If he is new to the system, the IVR menu directs him to (i) create a new password, (ii) enter his office telephone and facsimile numbers, (iii) record his spoken name for greeting and directory purposes, and (iv) record the name of this new team for his own convenience in moving around within his umbrella system address.

If this new member currently belongs to another team using the system, he is taken down a different IVR menu path to enable the consolidation of his new team communication session within his pre-existing umbrella system address. He will no longer need the account I.D., temporary password or mailbox number assigned to him for the new team. He will be asked to enter his pre-existing account I.D. and password and to record the name of the new team for his convenience in maneuvering within his umbrella system address. After enrolling on this new team, he can call his current 800 number and, using his pre-existing account I.D. and password, access all messages and documents relating to this new team. He will be advised that he should continue to use his current 800 number to log on the system and that he should destroy the written materials containing logon information that he was sent by the organizer of this new team. His pre-existing mailbox number will also be retained. The mailbox number assigned to him by the new team's organizer will be superseded by the pre-existing mailbox number when the user finishes the initialization/consolidation process during his call to enroll on the new team.

Immediately following the successful completion of the enrollment session, a member of a new team can call his assigned 800 number to access his new mailbox within his new team communication session. Any messages or documents previously sent to that mailbox number will be waiting. In the case of an existing user, the system will relate the mailbox number provided for initialization as a new team member with the pre-existing mailbox number, so that messages and documents will be routed correctly during team start-up. Once a new member enrolls, this member's name and mailbox number will be added to that team's directory. If this new member is an existing user, his pre-existing mailbox number will be placed in this team's directory in lieu of the mailbox number assigned to him during the formation of the new team.

E. Facsimile Integration

The system enables users to send facsimile documents to other users' team mailboxes and retrieve documents from their own team mailbox within each team communication session by "in-channel" facsimile retrieval. Addressing a facsimile document can be accomplished in the same fashion as a voice message.

F. Direct Connect and Re-connect

The system enables a user to speed dial the office phone number, in the system database, of any other member on the same team—the caller must make this call while in the communication session for the team on which the correspondent is also a member.

The speed-dial feature will enable the system to allow a user to call another member, wait for the call to connect, speak with the intended receiver and, when the call is over, hang up or return to the system. If the call does not connect or the intended receiver is not available, the caller can return easily to the system, leave a message for the intended receiver, and then continue his communication session. When a caller returns to the system after a speed-dial call, he will return to the point at which he left (i.e., in the same team session), be notified that he is back in that team session and be able to readily leave a message for the person just speed-dialed (on the assumption that at least 50% of the time he will not have reached the intended party when he speed-dialed). For reporting and billing purposes, the system can make a record of the user making a speed-dial call, the team member called and the specific team session from which the call was originated by that user.

From his personal communication session, if he has one, a subscriber can speed dial his own office phone number and his company's office voice mail phone number. A user may be permitted to designate a limited number of additional phone numbers as pre-authorized numbers to which the subscriber can be speed-dialed, but only when the user is in his personal communication session. These numbers need not be directly related to any other session user on the system (e.g., could be his home, office, secretary, etc.). The user can change these pre-authorized numbers (i) by speaking to the system administrator or (ii) by interacting with an IVR menu that can be accessed while in his personal communication session, after the user enters a preset security code.

Users will also be offered the option to connect directly to the system administrator's customer service operation if they need help.

G. Tracking and Billing

Within each user's umbrella system address and within each team or personal communication session, each message or facsimile sent, stored, responded to, forwarded, broadcasted and/or deleted can be tracked to identify the sender, receiver, time sent, time listened to, length of message, whether forwarded and to whom, etc. Billing is based primarily on the system connect time and outbound calling activity of each user within each communication session (team or personal). Bills can be rendered to each team organizer, rather than the user, for all on-line activity engaged in by his team members. The on-line activity in which a user engages while in his personal session, if he subscribes for one, will be billed to the user (or his firm).

Substantial additional storage can be provided for each team or personal communication session if a user needs it. All direct connect calls, discussed above, are tracked to identify such factors as the caller, receiver, time of call, length of call, whether reconnected, and the team session from which the call originated. Facsimile activity, particularly depositing documents into a mailbox or extracting documents out of a mailbox (with actual delivery occurring after the user has hung up), will be tracked for reporting and billing purposes. Facsimile, page and voice call alerts sent to users when senders leave "urgent" messages may also be tracked and reported by sender, receiver, time sent, team or personal session, etc.

H. Conference Calls

A "meet-me" conference call scheduling capability can also be offered to users. Any enabled user could schedule a conference call while in any of his team sessions by using the Direct Connect feature to speed dial to a live conference call reservationist. Upon obtaining a conference call reservation, the user can return to his session on the system (without hanging up) and send a broadcast message to all of his team members regarding the time and other details for the upcoming conference call.

An "ad hoc conference call" capability can be offered to enable a user to organize an immediate conference call with other team members while he is in his communication session for that specific team. While in the applicable team session, the user would speed dial to a conferencing bridge facility serving the system, instruct the system to place calls to the other team members desired and then have the conferencing bridge link all of these calls together to create a conference call.

I. Personal Communication Sessions

A personal communication session will be offered to each user when he is first assigned to a new team on the system. Personal delivery sessions can also be offered on a firm-by-firm basis. Such sessions can be set up for all key employees of a firm, enabling them to send and receive messages or documents to or from anyone inside or outside their firm who also subscribes to a personal communication session on the system. The consolidation feature described above for multiple team sessions would also be available for users with a personal session who are added to a new team.

For users who wish to have a communicating relationship outside of any team of which they may both be members, the system can provide this capability while such users are in their respective personal communication sessions.

Each user would have a personal directory of other users with whom he has communicating relationships. This directory would have the same kind of features/functions as team directories. However, the user could expand or contract this directory by interacting with an applicable IVR menu (e.g., by entering the mailbox number of a new correspondent). Whenever the user sends a message (including a reply) or document to another user, the recipient's name and mailbox number will be added to the sender's directory. If the recipient elects to block further communications from the sender (or executes a "global blocking" option as described below), the system will delete this user's listing from the sender's directory.

Forwarding of a message will be permitted, but only to persons who have previously-authorized communicating relationships with the original sender of such message. These recipients are not necessarily the same persons who have authorized communicating relationships with the forwarding party.

The system maintains a directory of all users who subscribe for a personal communications session on the system, regardless of whether they are also members of a team. This directory contains the name and mailbox number of each such user. Any user on the system could access this directory while in his own personal communication session and obtain the mailbox numbers of other users. To protect users against unilateral efforts to send messages or documents or speed dial to unwilling recipients, the system enables any user to remove his listing from the system directory and/or to block any specific user's privilege to communicate with the unwilling recipient. Whenever a user receives a message or document in the mailbox in his personal communication session, the user can select a "blocking" option from an IVR menu that will prevent the delivery to the user's mailbox of any future messages or documents sent by that sender. If a blocking option is selected, the system can also block any speed-dialed calls from that sender. The user can at any time reverse the blocking option he previously selected, using the applicable IVR menu.

Alternatively, a user can elect to block all senders who have not been expressly authorized by the user. The user can direct the system, using the applicable IVR menu, to implement such a "global blocking" option. Thereafter, the user can specify the limited set of other users with whom he wishes to communicate using the system features. The system provides an IVR menu enabling the user to create this list and then expand or contract it at any time thereafter.

J. Library

This feature enables a project team to create a repository of documents relevant to the team's activities. The "team library" will be open 24 hours a day, seven days a week, to all team members. Team members can enter documents into the library by facsimile transmission (or, alternatively, by e-mail) and can visit the library by making that menu selection during a team communication session. Before a user is granted access to the team library, he may, as an extra security measure, be required to enter a preset security code. The team's documents will often be confidential and the system can be configured to give them this extra layer of protection.

If a user wishes to retrieve a document the system will ask him to enter the card catalog number of the document he wants. If he does not know this document number, he can choose (i) to have an "index" of all available documents in the library delivered to him immediately by facsimile (or, alternatively, by e-mail), (ii) to play a list of the verbal annotations serving as headers for each document (as spoken by the contributor) with the document number recited thereafter by the system, or (iii) search for the document using dates or the identity of the contributor. If a document is marked "restricted access" by the person who contributed that document to the library, no listing of that document will appear in the index delivered to the subscriber requesting the index unless he is one of the team members specifically authorized by the contributor to see that document.

A user can also search for a document by entering (i) the date it was prepared, (ii) the date it was contributed to the library, (iii) the mailbox number or name (spelled or spoken) of the contributor, or (iv) the name (spelled only) of the contributor's firm. Once the user identifies the document he wants, he can instruct the system (i) to deposit it in his team mailbox (within the applicable team communication session) for later delivery to a facsimile machine (or, alternatively, an e-mail address) or (ii) to deliver it immediately to his default facsimile number or a different facsimile number he inputs at that time (or, alternatively, an e-mail address).

Any member of the team can contribute documents to the library at any time, sending such documents by facsimile or, alternatively, by e-mail. The system will ask the contributor to enter the date the document was created and the number of pages it contains. The remainder of the identifying information (i.e., date contributed, name of contributor and name of his firm) will be "attached" to each document by the system.

If the contributor wishes to restrict access to a specific document to certain members of the team, he can do that by indicating this is a "private" document and entering a list of those team members authorized to see it (i.e., by entering mailbox numbers, speaking members' names, or entering a group list number or name). The contributor can create, expand or contract a restricted access list at any time.

The team organizer or his designee will be responsible for managing his team's library as the team librarian. The team librarian will be given access to a special menu for library management. He may elect to draft and contribute a more informative index than the system can provide without such human intervention. He could use the team librarian's special menu to send by facsimile (or, alternatively, by e-mail), into a reserved slot in the library, an index with the subject matter of each document described. Thereafter, when team members request an index, they will be sent both the team librarian's subject matter index and the system's automated index.

Old or obsolete documents that have no continuing value to the team may need to be deleted to open up space for future documents. In this regard, an administrative limitation can be imposed on the number of pages that can be stored in a team library. A document's contributor can delete documents he contributed, but only the team librarian will be able to delete any document in the library.

For teams having large numbers of documents, a document classification scheme can use generic categories, such as (a) letters, (b) contracts, (c) spreadsheets, (d) presentations, (e) prospectuses, and (f) exhibits. The system can assign a range of available document numbers to each category. Each document would be assigned a catalog number within the appropriate category's range. Such a system would expedite searching large numbers of documents.

K. Anonymous Teams

A team organizer may elect to withhold from the system administrator the identity of any or all of the other members of a team. For projects requiring a high degree of confidentiality, establishing a team whose members are unknown even to the system administrator may be important to the parties involved. The team organizer could reserve a mailbox for each new member, identifying them to the system administrator only by letters, numbers or code names. All reports and billing would reflect each team member's activity by his identifying code. All correspondence between the team and the system administrator could be handled by the team organizer. Notwithstanding the above, each team member would be able to identify himself to his fellow team members and enable the team to function otherwise like any other team on the system. Anonymous team members could, if they elect, consolidate their new team sessions with their pre-existing communication sessions in the same manner as could any other user (whose identity was known at the time to the system administrator).

Figure Description

FIG. 1 shows the information transfer between logical elements of the disclosed communication architecture. The various functions and communication sessions are logically defined and implemented in software within the computer and peripheral electronic equipment in which the communication architecture operates. When a user enters the system for a standard logon procedure 1, for example, by dialing an 800 number, he is entered into an administrative session 2. He is asked to identify himself and his identity is checked by the registrar function 3 upon consultation with the database 4. If the registrar is satisfied with the user's security codes, he is given any administrative messages that may be appropriate and he is presented with a menu of options through a voice response system. The user enters his security codes and responds to the menu options through the dual tone multifrequency (DTMF) touch pad on his telephone instrument, or by voice response, if the system is equipped for voice recognition. The user then requests entry into a team communication session 5, 6, 7, 8 by identifying the team 5 with which he wants to communicate. If the registrar 3 has determined, by accessing its database 4 that the user has been authorized by the first team's team organizer 10 to communicate with the first team, he is entered into a first team communication session 5. Once in that session, he can access any messages in his first team mailbox left for him by the correspondents that are members of the first team and he can make use of any of the other communication functions he has been authorized to use. Such authorization is entered into the system by the team organizer 10 of the first team through the system administrator 9. The system administrator 9 communicates with the system through the registrar function 3.

When the user has completed his communication activities within his first team session 5, he signals that completion to the system and signals a request to engage in a second team session 6. The administrative function 2 within the system ends the user's first team session 5 and checks this user's second team authorization with the registrar. If this user is an authorized second team member, he is entered into a second team session 6. As part of the user's initial administrative session 2, the user may have responded to a menu choice by entering the order in which he wants to move from session to session. In that case, he will be exited from one session and entered into the next automatically upon signalling the system that the communication activities in each session have been completed. The registrar will have already checked the user's membership on each team.

At any time, the user can request entry into a personal communication session 8, if he has arranged for establishment of such a session. In that session, he can access his personal mailbox to receive messages left for him by individuals, outside of any team relationships, that he has authorized to communicate with him. He can communicate with anyone by any communication function to which he has subscribed.

Figure 2:
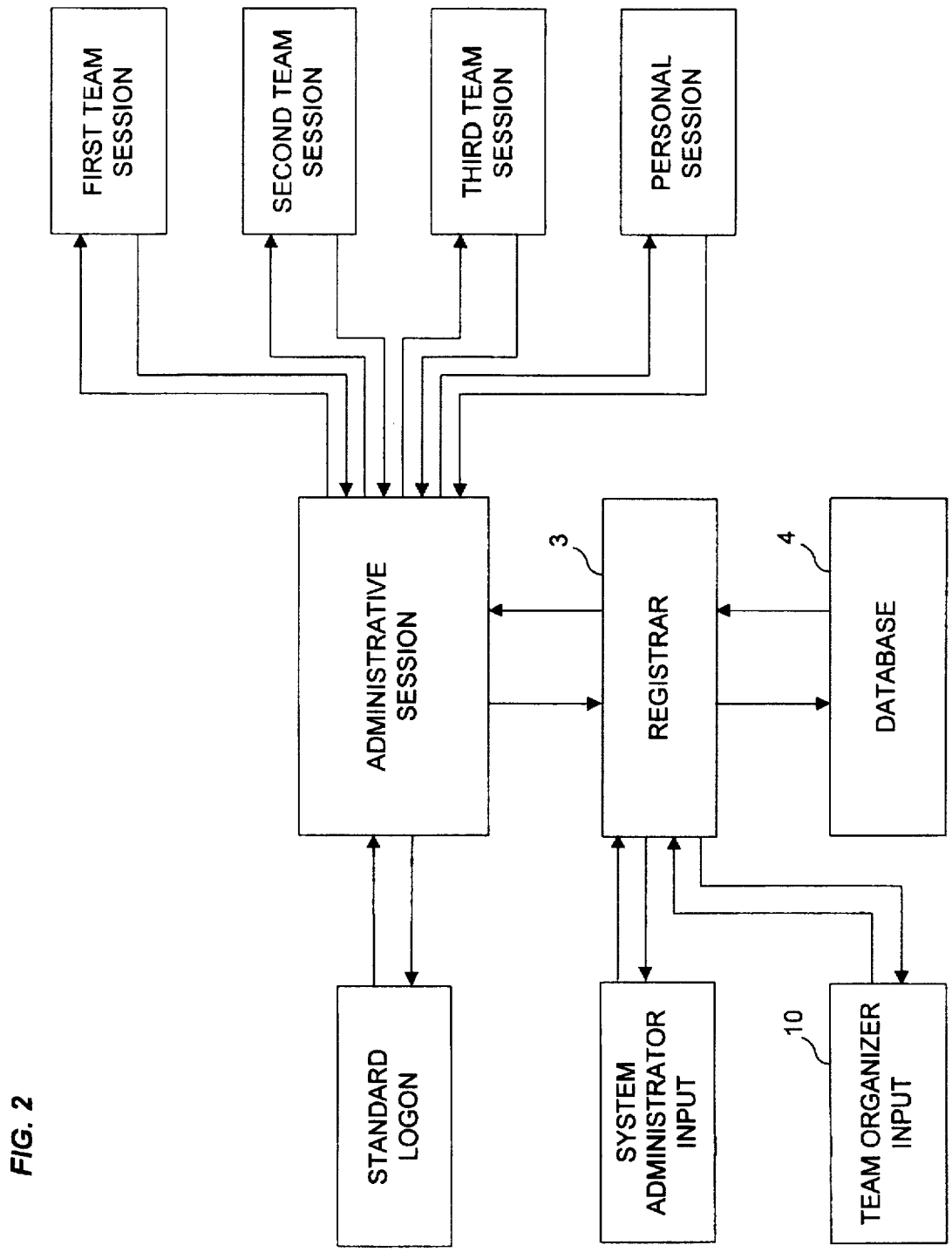
FIG. 2 is a block diagram showing information transfer between logical elements of the disclosed communication architecture, illustrating team organizer input directly into the registrar function of the system's computer.

FIG. 2 illustrates the possibility of team organizer input 10 directly into the system registrar 3 for storage in the database 4. If appropriate system security measures are implemented, such direct input of team information by each team organizer would reduce the transactional load on the system administrator. This would be particularly important for larger and busier systems.

Figure 3:
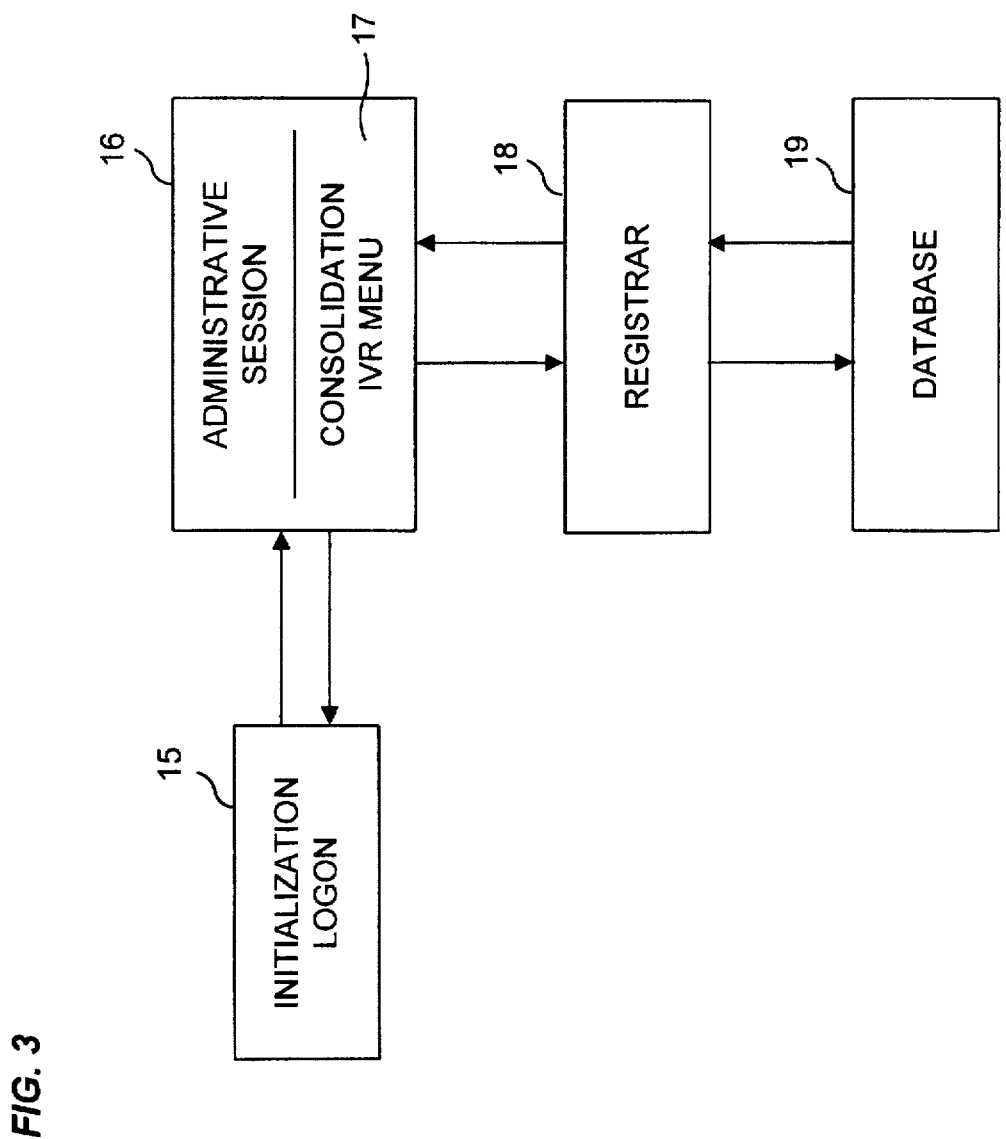
FIG. 3 is a block diagram showing information transfer between logical elements of the disclosed communication architecture illustrating the consolidation of user records when a user, who is already a member of one team, joins an additional team.

FIG. 3 illustrates information flow during a consolidation session. When a user joins a team, he is given a system access phone number and logon security codes that permit him to enter into an administrative session 16 that presents him with an initiation and consolidation interactive voice response menu 17. Within that menu, the user will be asked his new team affiliation and whether he is already a system user as a member of another team. His affiliation will be checked by the registrar 18 against information in the database 19, received from the team organizer of the newly assigned team. If he tells the system that he is already enrolled in the system as a member of another team, that will be checked by the registrar. If he is not already a system subscriber, the system access telephone number and logon security codes he was issued when he joined the team will be stored in the database and may be used by him to access this team session in the future. If he is already a member of another team, his new team records will be consolidated with his previous record and he may be authorized to use his prior phone number and logon security codes to access both his pre-existing team session and his new team session. In that way, one logon procedure using one set of security codes will enable the user to enter all of the team sessions he is authorized to enter.

Figure 4:
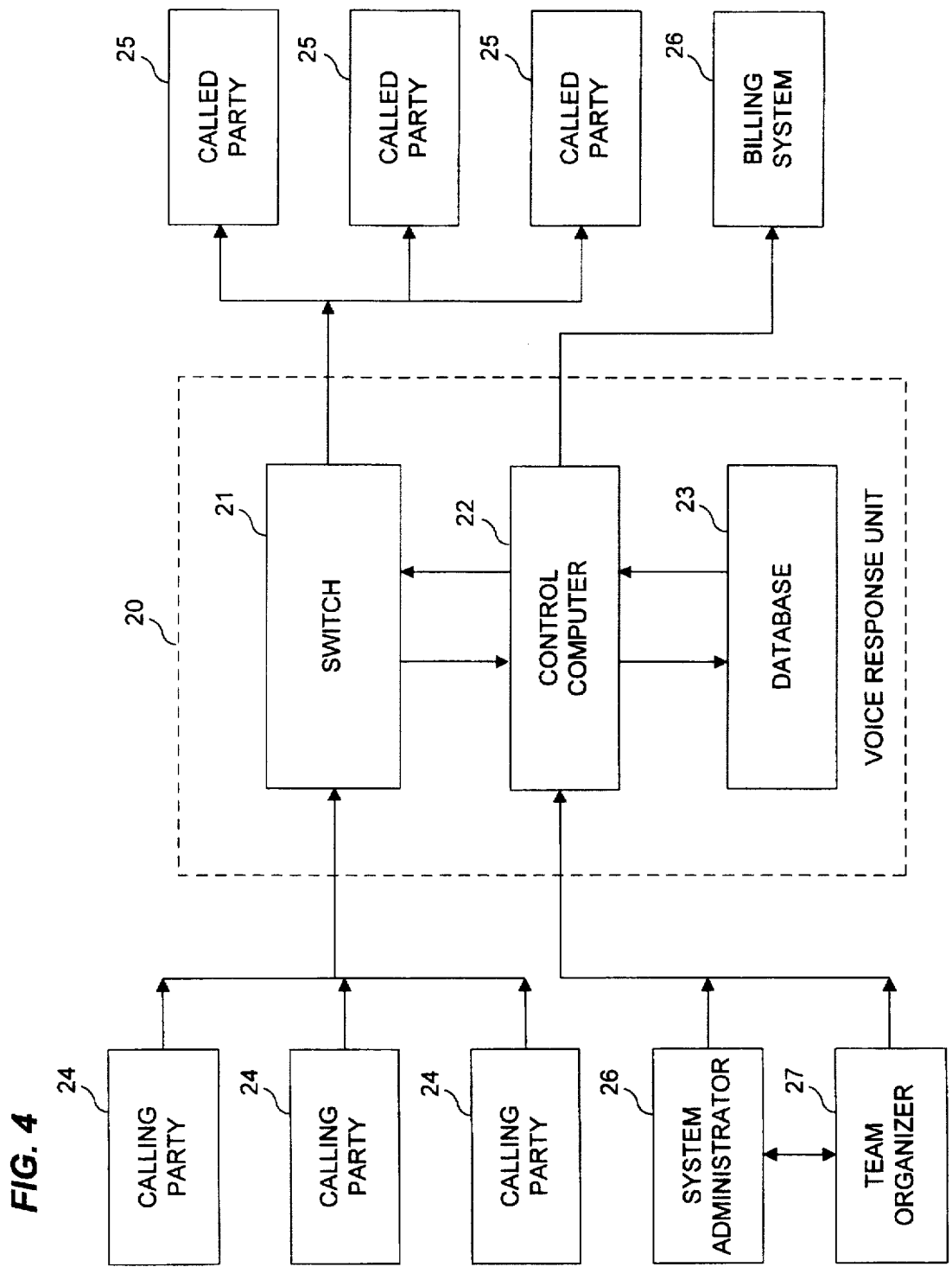
FIG. 4 is a block diagram of a communication system embodying the disclosed architecture, controlled by a single computer.

FIG. 4 illustrates the system upon which the disclosed communication architecture is implemented. The system's central operating entity is the Voice Response Unit (VRU) 20; it includes computer and peripheral input and output devices that implement three major functional entities; a switch 21, a central processor (control computer) 22, and a database 23. These functional entities can be realized as a single entity or some combination of separate entities and integrated entities and communicate with one another through data links and data busses. A party 24 calling into the system (whether to access one or more team sessions or a personal session) is connected to the switch 21 that passes the caller's identity information to the registrar function within the control computer 22. The control computer 22, accessing the database 23 when needed, manages the call to accomplish the functions illustrated in FIGS. 1–3 and instructs the computer to switch the call to parties 25 outside the system when requested by the user. However, most of the communication functions taking place in a communication session will be implemented within the VRU, including its peripheral equipment. The various mailboxes, voice response menus, and communication modes are software defined or software controlled. The control computer 22 receives team information from the team organizer 27 either directly or through the system administrator 26. Transmission into and out of the VRU 20 can be by analog or digital transmission lines implemented in such available media as copper wire, optical fiber, or wireless transmission. The switch 21 can be a separate mechanical or solid state switch or a semiconductor switch more closely integrated with the control computer 22. Billing can be accomplished directly through the data link to the team organizer 27 or through a datalink to a billing system 26.

Figure 5:
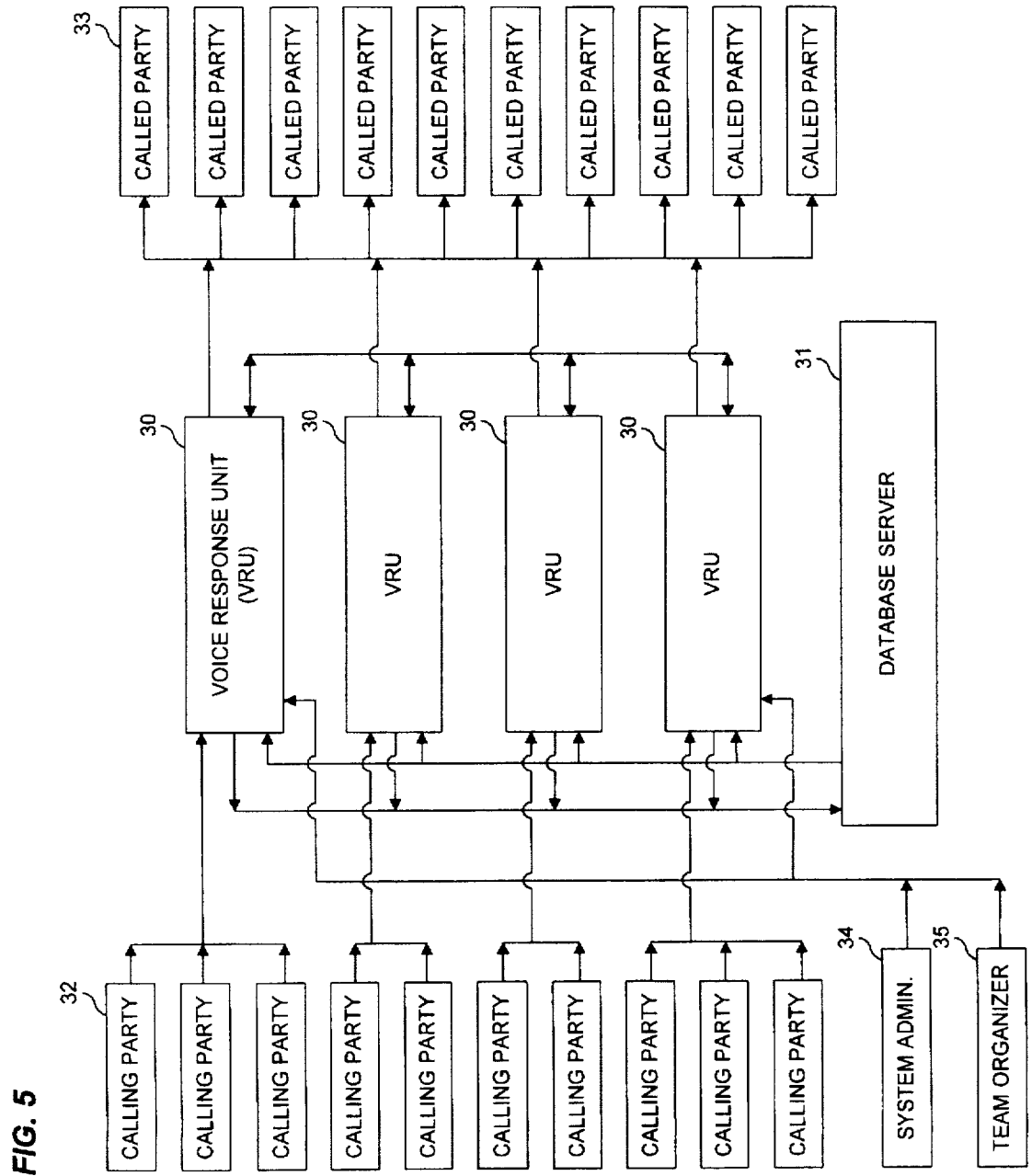
FIG. 5 is a block diagram of a communication system embodying the disclosed architecture, controlled by a plurality of computers networked to a database server.

FIG. 5 illustrates a larger capacity system in which several VRUs 30 are networked together with a database server 31. In many implementations, this database server 31 will contain most of the team enrollment information, while the database within each VRU will still contain each user's mailbox for efficient access. Each party 32 calling into the system, whether a team member or other authorized correspondent, will be provided with the access number of his assigned VRU. The system administrator 34 and team organizers 35 will communicate with each VRU 30. The VRUs 30 and database server 31 are networked to operate together, sharing information as needed and as required by the system's operating software.

Figure 6:
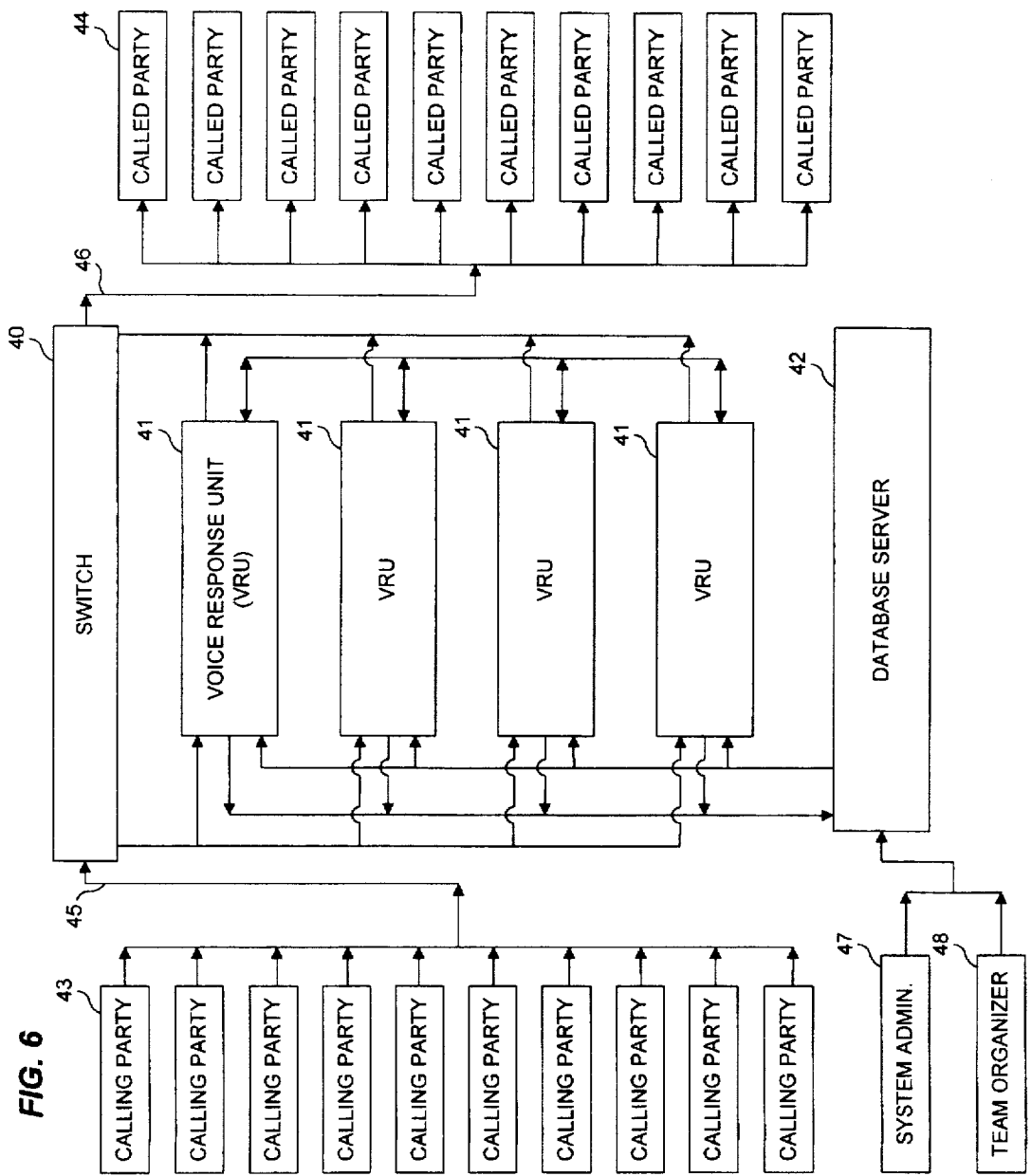
FIG. 6 is a block diagram of a communication system embodying the disclosed architecture, controlled by a plurality of computers networked to a database server and accessed by a common switch.

When the system grows to a sufficient size, a front end switch 40 can be added, as illustrated in FIG. 6. This switch can optimize usage of input and output transmission lines 45, 46, and permit use of a single system access number. The switch 40, after receiving each caller's logon security codes, will switch its call to the appropriate VRU 41, as directed by the VRU's control computers. In this case, it may be more efficient to permit the system administrator 45 and team organizers 48 to communicate directly with the database server 42. The database server, in that case, would have to be equipped with enough control intelligence to handle that information directly.

What is claimed is:

1. A method for electronic communication between a user and a plurality of correspondents by means of a communication system, the correspondents constituting at least a first-team and a second-team, the user being affiliated with the first-team and the second-team, the first-team having a first-team organizer, the second-team having a second-team organizer, and the method being administered by a system administrator, the method comprising:

(a) receiving in a computer automated voice communication system a logon request from the user to enter the system, the logon request comprising a user identifier;

(b) accessing a database to determine whether the user is authorized to enter the system;

(c) entering the user into the system in an administrative session;

(d) receiving a first-team identifier from the user and accessing the database to determine whether the user has been authorized by the first-team organizer to communicate with first-team correspondents;

(e) entering the user into a first-team communication session;

(f) while the user is in the first-team communication session, receiving at least one communication request from the user to communicate with at least a first first-team correspondent or to access the user's first-team mailbox for receiving messages from first-team correspondents, (g) accessing the database to determine whether the first first-team correspondent is designated by the first-team organizer as a member of the first-team;

(h) communicating with at least the first first-team correspondent and transmitting the contents of the user's first-team mailbox to the user until the communication requests are satisfied;

(i) receiving a request from the user to exit the first-team communication session;

(j) receiving a second-team identifier from the user and accessing the database to determine whether the user has been authorized by the second-team organizer to communicate with second-team correspondents; and (k) entering the user into a second-team communication session.

2. A method of claim 1 including receiving a request to enter the user's personal communication session and entering the user into a personal communication session, from which the user can originate communication with any correspondent and receive communication only from correspondents authorized by the user.

3. A method of claim 2 including communicating the contents of the user's personal mailbox to the user.

4. A method of claim 2 including receiving a request from the user to correspond with a nonteam correspondent and communicating with the nonteam correspondent.

5. A method of claim 1 in which the at least one communication request received from the user to communicate with at least the first first-team correspondent is:

(a) a request to communicate a voice message to a voice mailbox assigned to the first first-team correspondent; or (b) a request to communicate a voice message to a plurality of voice mailboxes assigned, respectively, to a plurality of the first-team correspondents, or (c) a request to communicate a facsimile message to the first first-team correspondent; or (d) a request to transmit a facsimile message to a plurality of the first-team correspondents; or (e) a request to initiate voice communication with the first first-team correspondents; or (f) a request to initiate voice communication with a plurality of the first-team correspondents; or (g) a request to enter a document into the database as an element of a first-team library; or (h) a request to retrieve a document from the first-team library.

6. A method of claim 5 including accessing the database to determine whether the user has been authorized by the first team organizer to communicate by means of the requested mode.

7. A method of claim 1 including entering all charges resulting from the first-team communication session into the database as a first-team billing record and entering all charges resulting from the second-team communication session as a second-team billing record.

8. A method of claim 1 including responding to user requests by means of a computer automated interactive voice response system, whereby the system transmits voice prompts to the user.

9. A method of claim 1 including receiving requests from the user by means of a computer automated voice recognition system, whereby the system translates user voice requests to computer recognizable digital signals.

10. A method of claim 1 in which communicating with the first first-team correspondent includes accessing the database to determine the first first-team correspondent's routing information and access information, and enabling a communication between the user and the first first-team correspondent.

11. A method of claim 10 in which enabling the communication consists essentially of entering the address of the first first-team correspondent's mailbox.

12. A method of claim 10 in which the first first-team correspondent's access information includes specification of the first first-team correspondent's communication format.

13. A method of claim 1 in which the user transmits the second-team identifier and any subsequent team identifiers, in an order of desired access, prior to entering the first-team communication session and the system enters the user into the second-team communication session and subsequent communication sessions in the order of desired access upon receiving the request from the user to exit each communication session.

14. A method of claim 1 including receiving database update information from the system administrator and entering the update information in the database.

15. A method of claim 1 including receiving database update information from the first-team organizer, determining whether the first-team organizer is authorized to transmit the update information for entry into the database, and entering the update information in the database.

16. A method of claim 1 including receiving a request from the user to access a first-team directory and providing the user access to the first-team directory.

17. A method of claim 1 including receiving a request from the user to access a first-team document library and providing the user access to the first-team document library.

18. A method of claim 1 in which the user's first-team mailbox includes a capability to receive an e-mail message.

19. A method of claim 1 in which communicating with the first first-team correspondent includes transmitting an e-mail message.

20. A method for electronic communication between a user and a plurality of correspondents by means of a communication system, the correspondents constituting at least a first-team and a second-team, the first-team having a first-team organizer, the second-team having a second-team organizer, and the method being administered by a system administrator, the method comprising:

(a) receiving in a computer automated voice communication system an initial logon request from the user comprising a user identifier and a first-team identifier;

(b) accessing the database to determine whether the user has been authorized by the first-team organizer to communicate with the first-team;

(c) entering a first-team record identifying the user into the database;

(d) determining whether the user is authorized by the second-team organizer to communicate with the second-team; and (e) consolidating, upon the user's election, the user's first-team record and second-team record, whereby a single logon will enable the user to enter into at least a first-team communication session and a second-team communication session.

21. A computer automated voice communication system for communicating between a user and a plurality of correspondents, the correspondents constituting at least a first-team and a second-team, the user being affiliated with the first-team and the second-team, the first-team having a first-team organizer, the second-team having a second-team organizer, and the system being administered by a system administrator, the system comprising:

(a) a computer;

(b) a computer memory with a database;

(c) means for receiving a logon request from the user to enter the system;

(d) means for accessing the database to determine whether the user is authorized to enter the system;

(e) means for entering the user into an administrative session;

(f) means for receiving a first-team identifier from the user and accessing the database to determine whether the user has been authorized by the first-team organizer to communicate with first-team correspondents;

(g) means for entering the user into a first-team communication session;

(h) means for receiving at least one communication request from the user to communicate with at least a first first-team correspondent or to access the user's first-team mailbox for receiving messages from first-team correspondents while the user is in the first-team communication session;

(i) means for communicating with at least the first first-team correspondent and for transmitting the contents of the user's first-team mailbox to the user;

(j) means for ending the first-team communication session;

(k) means for receiving a request from the user to communicate with second-team correspondents and accessing the database to whether second-team access by the user has been authorized by the second-team organizer; and (l) means for entering the user into a second-team communication session.

22. A system of claim 21 including means for billing all charges resulting from the first-team communication session to the first-team and all charges resulting from the second-team communication session to the second-team.

23. A method for electronic communication between a user and a plurality of correspondents by means of a communication system, the correspondents constituting at least a first-team and a second-team, the user being affiliated with the first-team and the second-team, the first-team having a first-team organizer, the second-team having a second-team organizer, and the method being administered by a system administrator, the method comprising:

(a) receiving in a computer automated voice communication system a logon request from the user to enter the system, the logon request comprising a user identifier;

(b) accessing a database to determine whether the user is authorized to enter the system;

(c) entering the user into the system in an administrative session;

(d) receiving a first-team identifier from the user and accessing the database to determine whether the user has been authorized by the first-team organizer to communicate with first-team correspondents;

(e) entering the user into a first-team communication session;

(f) receiving at least one communication request from the user to communicate with at least a first first-team correspondent or to access the user's first-team mailbox for receiving messages from first-team correspondents, (g) accessing the database to determine whether the first first-team correspondent is designated by the first-team organizer as a member of the first-team;

(h) communicating with at least the first first-team correspondent and transmitting the contents of the user's first-team mailbox to the user until the communication requests are satisfied;

(i) receiving a request from the user to exit the first-team communication session;

(j) receiving a second-team identifier from the user and accessing the database to determine whether the user has been authorized by the second-team organizer to communicate with second-team correspondents; and (k) entering the user into a second-team communication session and further including receiving a request to enter the user's personal communication session and entering the user into a personal communication session, from which the user can originate communication with any correspondent and receive communication only from correspondents authorized by the user.

24. A method of claim 23 including communicating the contents of the user's personal mailbox to the user.

25. A method of claim 23 including receiving a request from the user to correspond with a nonteam correspondent and communicating with the nonteam correspondent.

26. A method for electronic communication between a user and a plurality of correspondents by means of a communication system, the correspondents constituting at least a first-team and a second-team, the user being affiliated with the first-team and the second-team, the first-team having a first-team organizer, the second-team having a second-team organizer, and the method being administered by a system administrator, the method comprising:

(a) receiving in a computer automated voice communication system a logon request from the user to enter the system, the logon request comprising a user identifier;

(b) accessing a database to determine whether the user is authorized to enter the system;

(c) entering the user into the system in an administrative session;

(d) receiving a first-team identifier from the user and accessing the database to determine whether the user has been authorized by the first-team organizer to communicate with first-team correspondents;

(e) receiving from the user the second-team identifier and any subsequent team identifiers, in an order of desired access, prior to entering the first-team communication session;

(f) entering the user into a first-team communication session;

(g) receiving at least one communication request from the user to communicate with at least a first first-team correspondent or to access the user's first-team mailbox for receiving messages from first-team correspondents, (h) accessing the database to determine whether the first first-team correspondent is designated by the first-team organizer as a member of the first-team;

(i) communicating with at least the first first-team correspondent and transmitting the contents of the user's first-team mailbox to the user until the communication requests are satisfied;

(j) receiving a request from the user to exit the first-team communication session; and (k) and entering the user into the second-team communication session and subsequent communication sessions in the order of desired access upon receiving the request from the user to exit each communication session after accessing the database to determine whether the user has been authorized by the second-team organizer and subsequent team organizers to communicate with respective team correspondents.

27. A computer automated voice communication system for communicating between a user and a plurality of correspondents, the correspondents constituting at least a first-team and a second-team, the user being affiliated with the first-team and the second-team, the first-team having a first-team organizer, the second-team having a second-team organizer, and the system being administered by a system administrator, the system comprising:

(a) a computer;

(b) a computer memory with a database;

(c) means for receiving a logon request from the user to enter the system;

(d) means for accessing the database to determine whether the user is authorized to enter the system;

(e) means for entering the user into an administrative session;

(f) means for receiving a first-team identifier from the user and accessing the database to determine whether the user has been authorized by the first-team organizer to communicate with first-team correspondents;

(g) means for receiving a second-team identifier and any subsequent team identifiers, in an order of desired access, prior to entering the first-team communication session and accessing the database to determine whether the user has been authorized by the second-team organizer and subsequent team organizers to communicate with respective team correspondents;

(h) means for entering the user into a first-team communication session;

(i) means for receiving at least one communication request from the user to communicate with at least a first first-team correspondent or to access the user's first-team mailbox for receiving messages from first-team correspondents;

(j) means for communicating with at least the first first-team correspondent and for transmitting the contents of the user's first-team mailbox to the user;

(k) means for ending the first-team communication session; and (l) means for entering the user into the second-team communication sessions and subsequent communication sessions in the order of desired access upon receiving the request from the user to exit each communication session.

* * * * *